United States Patent
Winter

(10) Patent No.: US 9,253,697 B2
(45) Date of Patent: Feb. 2, 2016

(54) INTER-RAT RESELECTION IN MOBILE COMMUNICATION SYSTEMS

(71) Applicant: Marvell World Trade Ltd., St. Michael (BB)

(72) Inventor: Itai Winter, Zeitan (IL)

(73) Assignee: Marvell World Trade Ltd., St. Michael (BB)

( * ) Notice: Subject to any disclaimer, the term of this patent is extended or adjusted under 35 U.S.C. 154(b) by 176 days.

(21) Appl. No.: 14/050,376

(22) Filed: Oct. 10, 2013

(65) Prior Publication Data

US 2014/0106752 A1     Apr. 17, 2014

Related U.S. Application Data

(60) Provisional application No. 61/714,571, filed on Oct. 16, 2012.

(51) Int. Cl.
| | |
|---|---|
| *H04W 36/36* | (2009.01) |
| *H04W 36/16* | (2009.01) |
| *H04W 48/18* | (2009.01) |
| *H04W 36/30* | (2009.01) |
| *H04W 60/04* | (2009.01) |

(52) U.S. Cl.
CPC ............ *H04W 36/165* (2013.01); *H04W 48/18* (2013.01); *H04W 36/30* (2013.01); *H04W 60/04* (2013.01); *Y02B 60/50* (2013.01)

(58) Field of Classification Search
CPC .................................................... H04W 36/36
USPC ................................................... 455/436, 437
See application file for complete search history.

(56) References Cited

U.S. PATENT DOCUMENTS

| | | | | |
|---|---|---|---|---|
| 8,351,944 | B2* | 1/2013 | Lee | H04W 36/0016 455/435.1 |
| 8,634,831 | B2* | 1/2014 | Jung | H04W 48/16 370/329 |
| 2005/0250499 | A1* | 11/2005 | Lee | H04W 36/0055 455/437 |
| 2007/0291698 | A1* | 12/2007 | Lee | H04W 36/12 370/331 |
| 2009/0088160 | A1 | 4/2009 | Pani et al. | |
| 2010/0093356 | A1 | 4/2010 | Lee et al. | |
| 2011/0143752 | A1 | 6/2011 | Hong | |
| 2012/0040687 | A1 | 2/2012 | Siomina et al. | |
| 2013/0188503 | A1* | 7/2013 | Anepu | H04W 24/10 370/252 |

OTHER PUBLICATIONS

International Application # PCT/IB2013/059333 Search Report dated Mar. 13, 2014.
3GPP TS 45.002 "Technical Specification Group GSM/EDGE Radio Access Network; Multiplexing and multiple access on the radio path (Release 8),", version 8.1.0, pp. 1-105, Mar. 2011.

(Continued)

*Primary Examiner* — Christopher M Brandt

(57) ABSTRACT

A method includes, in a mobile communication terminal that is camped on a serving cell, evaluating signals of one or more neighbor cells, and permitting the terminal to switch to a neighbor cell when a signal of the neighbor cell meets a reselection criterion for at least a predefined reselection interval. Acquisition of one or more configuration parameters of the neighbor cell is initiated at least partly in parallel with the reselection interval of the neighbor cell. Following the reselection interval, a switch is made to camp on the neighbor cell using the acquired configuration parameters.

19 Claims, 3 Drawing Sheets

(56) References Cited

OTHER PUBLICATIONS

GPP TS 45.002 "Technical Specification Group GSM/EDGE Radio Access Network; Radio subsystem link control (Release 8)," version 8.14.0, pp. 1-144, Mar. 2012.
3GPP TS 25.133 "Technical Specification Group Radio Access Network; Requirements for support of radio resource management (FDD) (Release 8)," version 8.15.0, pp. 1-238, Sep. 2011.
3GPP TS 25.133 "Technical Specification Group Radio Access Network; Radio Resource Control (RRC); Protocol specification (Release 8)," version 8.14.0, pp. 1-238, Mar. 2011.
3GPP TS 36.304 "Technical Specification Group Radio Access Network; Evolved Universal Terrestrial Radio Access (E-UTRA); User Equipment (UE) procedures in idle mode (Release 8)," version 8.10.0, pp. 1-29, Jun. 2011.
3GPP TS 36.33 "Technical Specification Group Radio Access Network; Evolved Universal Terrestrial Radio Access (E-UTRA) Radio Resource Control (RRC); Protocol specification (Release 8)," version 8.8.0, pp. 1-211, Dec. 2009.
3GPP TS 36.133 "Technical Specification Group Radio Access Network; Evolved Universal Terrestrial Radio Access (E-UTRA); Requirements for support of radio resource management (Release 8)," version 8.17.0, pp. 1-215, Mar. 2012.
3GPP TS 36.523-1 "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 10)", version 10.2.0, pp. 1-3100, Sep. 2012.

\* cited by examiner

INTER-RAT RESELECTION IN MOBILE COMMUNICATION SYSTEMS

CROSS-REFERENCE TO RELATED APPLICATIONS

This application claims the benefit of U.S. Provisional Patent Application 61/714,571, filed Oct. 16, 2012, whose disclosure is incorporated herein by reference.

FIELD OF THE DISCLOSURE

The present disclosure relates generally to wireless communication, and particularly to methods and systems for cell reselection in cellular communication systems.

BACKGROUND

Cellular communication systems typically support reselection processes, in which wireless communication terminals reselect the cells via which they communicate. In order to communicate via a newly-selected cell, the wireless communication terminal typically needs to acquire System Information (SI) parameters of the new cell.

Cell reselection and SI acquisition in Global System for Mobile communications (GSM) are specified, for example, by the Third Generation Partnership Project (3GPP), in "Technical Specification Group GSM/EDGE Radio Access Network; Multiplexing and multiple access on the radio path (Release 8)," TS 45.002, version 8.1.0, March, 2011; and in "Technical Specification Group GSM/EDGE Radio Access Network; Radio subsystem link control (Release 8)," TS 45.008, version 8.14.0, March, 2012, which are incorporated herein by reference.

Cell reselection and SI acquisition in Universal Mobile Telecommunications System (UMTS) are also specified by 3GPP, for example in "Technical Specification Group Radio Access Network; Requirements for support of radio resource management (FDD) (Release 8)," TS 25.133, version 8.15.0, September, 2011; and in "Technical Specification Group Radio Access Network; Radio Resource Control (RRC); Protocol specification (Release 8)," TS 25.331, version 8.14.0, March, 2011, which are incorporated herein by reference.

For Evolved Universal Terrestrial Radio Access (E-UTRA) systems, also referred to as Long Term Evolution (LTE), Cell reselection and SI acquisition are also specified by 3GPP, for example, in "Technical Specification Group Radio Access Network; Evolved Universal Terrestrial Radio Access (E-UTRA); User Equipment (UE) procedures in idle mode (Release 8)," TS 36.304, version 8.10.0, June, 2011; in "Technical Specification Group Radio Access Network; Evolved Universal Terrestrial Radio Access (E-UTRA) Radio Resource Control (RRC); Protocol specification (Release 8)," TS 36.331, version 8.8.0, December, 2009; in "Technical Specification Group Radio Access Network; Evolved Universal Terrestrial Radio Access (E-UTRA); Requirements for support of radio resource management (Release 8)," TS 36.133, version 8.17.0, March, 2012; and in "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 10)," TS 36.523-1, version 10.2.0, September, 2012, which are incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal that is camped on a serving cell, evaluating signals of one or more neighbor cells, and permitting the terminal to switch to a neighbor cell when a signal of the neighbor cell meets a reselection criterion for at least a predefined reselection interval. Acquisition of one or more configuration parameters of the neighbor cell is initiated at least partly in parallel with the reselection interval of the neighbor cell. Following the reselection interval, a switch is made to camp on the neighbor cell using the acquired configuration parameters.

In some embodiments, the method includes communicating with the serving cell using a first Radio Access Technology (RAT), and communicating with the neighbor cell using a second RAT that is different from the first RAT. In an embodiment, the method includes refraining from acquiring the configuration parameters until the neighbor cell meets the reselection criterion. In a disclosed embodiment, initiating the acquisition includes acquiring, during the reselection interval, a subset of the configuration parameters that enables verification that the terminal is permitted to camp on the neighbor cell, and switching to camp on the neighbor cell following the reselection interval only upon ascertaining that the terminal is permitted to camp on the neighbor cell.

In some embodiments, initiating the acquisition includes acquiring, during the reselection interval, at least part of a subset of the configuration parameters that enables verification that the terminal is permitted to camp on the neighbor cell and further enables access to the neighbor cell, and switching to camp on and access the neighbor cell following the reselection interval upon obtaining the subset of the configuration parameters. In an embodiment the method includes, upon identifying that the subset of the configuration parameters is not fully available following the reselection interval, completing to acquire the subset, and only then switching to camp on and access the neighbor cell.

In other embodiments, evaluating the signals includes initiating multiple reselection intervals for multiple respective neighbor cells, and initiating the acquisition includes selecting one or more of the multiple neighbor cells and initiating the acquisition of the configuration parameters only for the selected neighbor cells. In a disclosed embodiment, selecting the one or more neighbor cells includes choosing the one or more neighbor cells whose reselection intervals are nearest to expire.

In an embodiment, the method includes aborting the acquisition upon detecting errors in the acquired configuration parameters. In another embodiment, initiating the acquisition of the configuration parameters includes initiating reception of a System Information (SI) message from the neighbor cell.

There is additionally provided, in accordance with an embodiment that is described herein, apparatus including a receiver and processing circuitry. The receiver is configured to receive signals from a serving cell and from one or more neighbor cells. The processing circuitry is configured to evaluate the signals of the neighbor cells while camped on a serving cell and to permit switching to a neighbor cell when a signal of the neighbor cell meets a reselection criterion for at least a predefined reselection interval, to initiate acquisition of one or more configuration parameters of the neighbor cell at least partly in parallel with the reselection interval of the neighbor cell, and, following the reselection interval, to switch to camp on the neighbor cell using the acquired configuration parameters.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
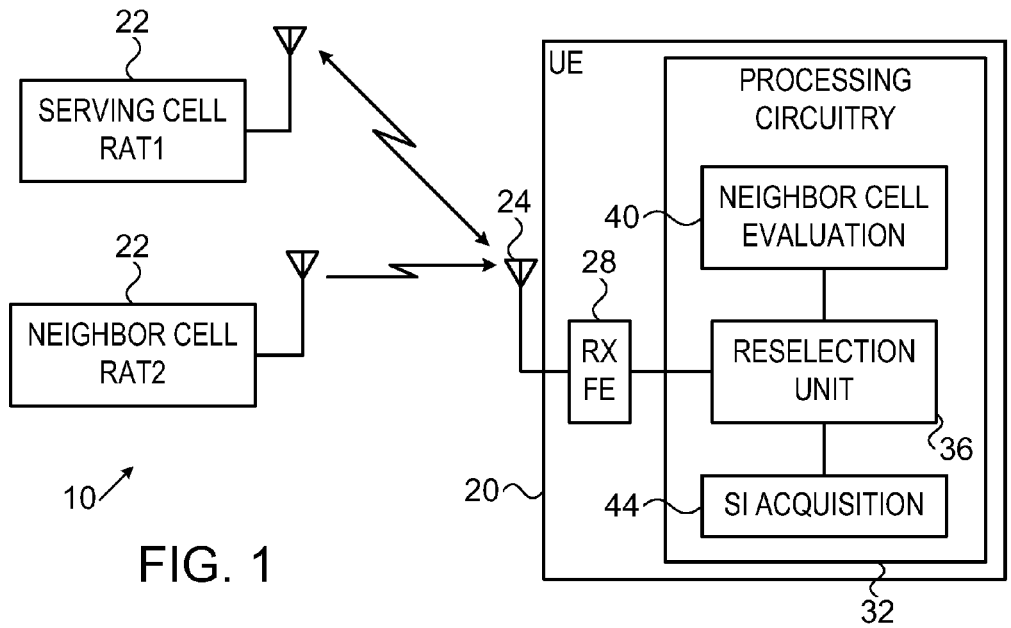
FIG. 1 is a block diagram that schematically illustrates a cellular communication system, in accordance with an embodiment that is described herein.

Embodiments that are described herein provide improved methods and systems for performing cell reselection in cellular communication systems. The embodiments described herein refer mainly to reselection between cells of different Radio Access Technologies (RATs), but the disclosed techniques are equally applicable to reselection within the same RAT.

In some embodiments, a wireless communication terminal communicates via a serving cell, and at the same time evaluates the quality of signals received from one or more neighbor cells. If the signal of a neighbor cell meets predefined reselection criteria, the neighbor cell is added to a list of reselection candidates. In order to qualify for reselection, the neighbor cell should continue to meet the reselection criteria during a predefined reselection interval. If this condition is met, the terminal may decide to perform cell reselection, i.e., switch to camp on the qualifying neighbor cell.

In a typical implementation, upon identifying a neighbor cell that meets the reselection criteria, the terminal initiates a timer that measures the reselection interval for that neighbor cell. When the timer expires, and provided that the neighbor cell still meets the reselection criteria, reselection is permitted.

In order to start communicating via the newly-reselected cell, i.e., define the new cell as the serving cell, the terminal is required to acquire the System Information (SI) of this cell. The SI specifies various configuration parameters of the cell. Acquisition of SI is often a lengthy and power-consuming task, which may lengthen the overall reselection time considerably.

In some embodiments that are described herein, the terminal does not wait until a neighbor cell is fully qualified for reselection, but instead begins to acquire the SI of the neighbor cell as soon as the neighbor cell is first found to meet the reselection criteria. In other words, the terminal begins to acquire the SI as soon as the neighbor cell's reselection interval is initiated, rather than waiting for the successful end of the reselection interval. This feature shortens the overall reselection time considerably.

In theory, there is some risk that the neighbor cell will not meet the reselection criteria during the entire reselection interval. In such a case, the neighbor cell does not qualify for reselection, and the early SI acquisition incurs unnecessary power consumption. Nevertheless, in practice the probability of this scenario is low, and fast reselection is usually well worth the possible unnecessary consumption of power.

In some scenarios, the terminal identifies two or more neighbor cells that meet the reselection criteria, and thus measures multiple overlapping reselection intervals. In such scenarios, acquiring the SI of all the candidate neighbor cells may be too computationally intensive and/or too power consuming. Therefore, in some embodiments the terminal chooses a partial subset of the candidate cells whose reselection intervals have begun, and acquires the SI only for the cells in the partial subset. The terminal may use various criteria for choosing the partial subset, e.g., it may choose the cell or cells whose reselection intervals are next to expire.

The full set of SI configuration parameters enables the terminal to camp normally on the neighbor cell in question. In some embodiments, the terminal identifies within the full set a "minimal set," whose acquisition enables the terminal to verify whether the cell is suitable for camping on. The terminal may also identify a "medium set," whose acquisition enables the terminal to access the cell.

In some cases, when the reselection interval ends, the terminal has not yet acquired the full set of configuration parameters, but did acquire the minimal set. If the minimal set indicates that the neighbor cell is not suitable for camping on, the terminal is able to reselect to a different neighbor cell with only a small time penalty. If the terminal were to start acquiring the SI only at the end of the reselection interval, the time penalty would be considerably greater. Similar time saving can be achieved in accessing the neighbor cell by using only the medium set. By using these techniques, the terminal is able to reduce the impact of reselection failures, and to generally reduce reselection time.

FIG. 1 is a block diagram that schematically illustrates a cellular communication system 10, in accordance with an embodiment that is described herein. System 10 comprises a mobile communication terminal 20, also referred to as User Equipment (UE). In an embodiment, UE 20 is capable of communicating with base stations of multiple RATs, e.g., GSM, WCDMA (UTRA) and/or LTE (E-UTRA) base stations. The base stations are also referred to as cells, NodeBs or eNodeBs.

In the present example, one base station (denoted 22A) is defined as the serving cell of UE 20, and another base station (denoted 22B) is a neighbor cell. In this example, although not necessarily, the serving and neighbor cell operate in accordance with two different RATs denoted RAT1 and RAT2, respectively. FIG. 1 shows only a single neighbor cell, for the sake of clarity. Real-life scenarios, however, often involve multiple neighbor cells.

In the embodiment of FIG. 1, UE 20 comprises one or more antennas 24 for receiving downlink signals from the base stations, a receiver front end (RX FE) 28 and processing circuitry 32. RX FE 28 down-converts the received signals to baseband, and typically performs additional functions such as filtering and gain control. The resulting baseband signal is provided to processing circuitry 32 for processing. Processing circuitry 32 carries out the various digital processing tasks of the UE. In the present context, however, only the elements relating to reselection are shown and described, for the sake of clarity.

In some embodiments, processing circuitry comprises a reselection unit 36, a neighbor cell evaluation unit 40 and a SI acquisition unit 44. Reselection unit 36 carries out the disclosed reselection processes. Neighbor cell evaluation unit 40 evaluates the quality of downlink signals received from neighbor cells. SI acquisition unit 44 acquires the SI of cells, so as to enable UE 20 to access and camp on the cells.

The UE configuration shown in FIG. 1 is an example configuration, which is depicted solely for the sake of clarity. In alternative embodiments, any other suitable UE configuration can be used. For example, the functional partitioning among units 36, 40 and 44 in processing circuitry is given purely by way of example. In alternative embodiments, the reselection-related tasks of the processing circuitry may be performed using any other suitable configuration of any desired number of units.

Some UE elements that are not mandatory for understanding of the disclosed techniques, for example transmission circuitry of the UE, have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements.

In some embodiments, some elements of UE 20 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In some embodiments, processing circuitry 32 is configured to perform cell reselection, or simply reselection for brevity. Typically, reselection is permitted both within the same RAT and between cells of different RATs. In order to qualify for reselection, the signal of a neighbor cell should meet predefined reselection criteria for the duration of a predefined reselection interval, denote $T_{RESELECTION}$ Typical values of $T_{RESELECTION}$ are, for example, five seconds for ranking-based inter-RAT reselection in GSM, one to two seconds in UMTS, and around two seconds for LTE. Alternatively, however, any other suitable $T_{RESELECTION}$ values can be used.

In an embodiment, reselection unit 36 identifies neighbor cells, and instructs neighbor cell evaluation unit 40 to evaluate the quality of the neighbor cell signals. When appropriate, reselection unit 36 instructs SI acquisition unit 44 to acquire the SI of a neighbor cell, in order to enable access to the cell and camping on the cell.

Figure 2:
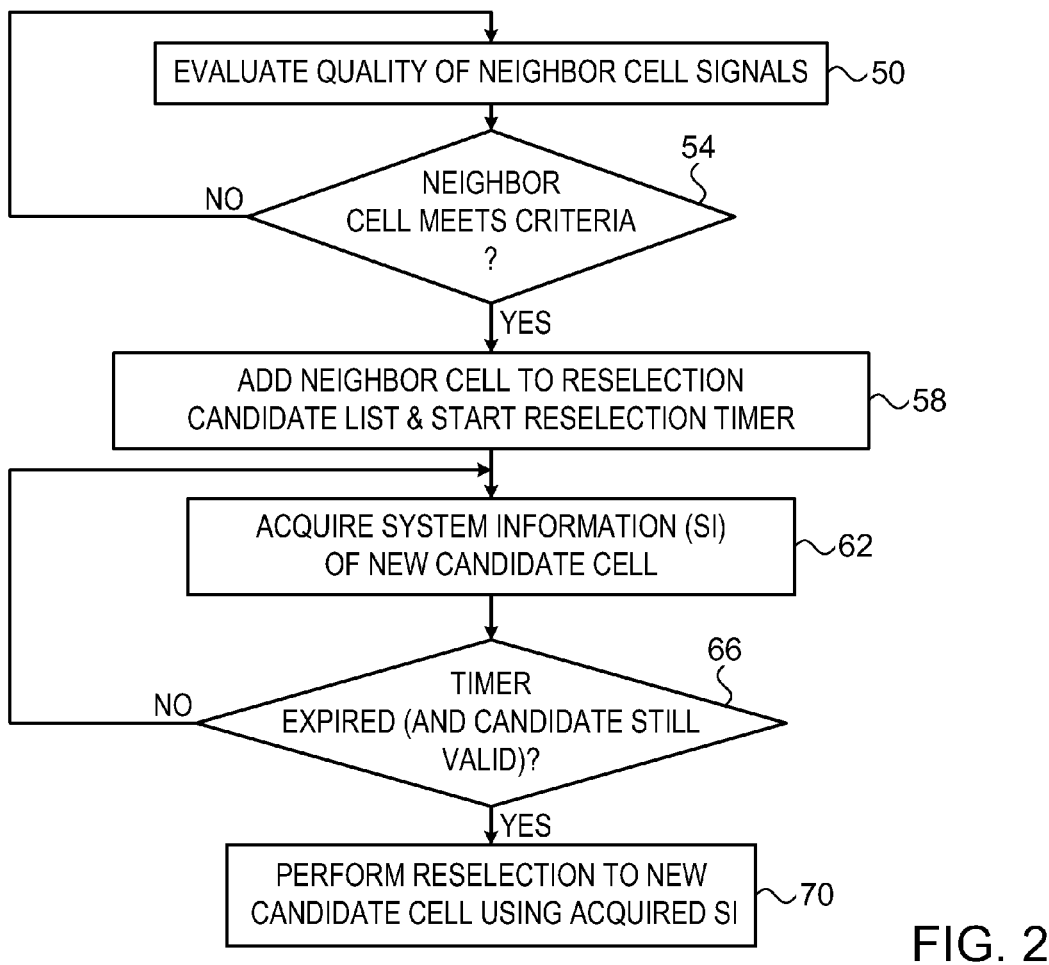
FIG. 2 is a flow chart that schematically illustrates a method for inter-RAT reselection, in accordance with an embodiment that is described herein.

FIG. 2 is a flow chart that schematically illustrates a method for inter-RAT reselection, in accordance with an embodiment that is described herein. The description that follows refers mainly to inter-RAT reselection. This method, however, is applicable to reselection between cells of the same RAT, as well. Note also that the method of FIG. 2 is a highly simplified method, which is depicted in order to demonstrate the effectiveness of early SI acquisition. In alternative embodiments, early SI acquisition may be implemented in any other suitable way.

The method of FIG. 2 begins with neighbor cell evaluation unit 40 evaluating the quality of signals received from one or more neighbor cells, at a neighbor evaluation operation 40. Reselection unit 36 checks whether any of the neighbor cell signals meets the reselection criteria, at a criteria checking operation 54. If not, the method loops back to operation 50 above. Example reselection criteria can be found, for example, in section 6.6.5 of 3GPP TS 45.008, cited above and incorporated herein by reference.

If the signal of a certain neighbor cell meets the reselection criteria, reselection unit 36 adds this neighbor cell to a list of reselection candidates, at a list updating operation 58. At this point, reselection unit 58 initiates a timer that measures the reselection interval $T_{RESELECTION}$ for the newly-added candidate cell.

During the reselection interval (i.e., without waiting for the reselection interval to end), SI acquisition unit 44 begins to acquire the SI of the new candidate cell, at a SI acquisition operation 62. The SI acquisition time may be shorter or longer than the reselection interval. In other words, SI acquisition does not necessarily end before $T_{RESELECTION}$ expires. Possible scenarios are addressed in FIGS. 3A-3C below.

Reselection unit 36 checks whether the new candidate cell qualifies for reselection (i.e., whether the $T_{RESELECTION}$ for timer expires and the candidate cell signal still meets the reselection criteria), at a qualification checking operation 66. If the reselection interval did not end yet, the method loops back to operation 62. When the reselection interval ends, and provided the candidate signal still meets the reselection criteria, reselection unit 36 is permitted to perform reselection to the candidate cell, at a reselection operation 70. Reselection is performed using the acquired SI.

As explained above, in the disclosed embodiments the SI acquisition process begins during (typically at the beginning of) the reselection interval, without waiting for full qualification of the candidate cell at the end of the reselection interval. Therefore, the overall reselection time is shortened considerably.

The disclosed technique balances power-saving and reselection time, both important performance characteristics of the terminal: At one extreme, it is possible in principle to acquire the SI for any identified neighbor cell, regardless of whether it meets the reselection criteria. This solution is costly in terms of power, because the terminal would unnecessarily acquire SI of weak and low-quality cells. At the other extreme, it is possible to start acquiring the SI of a cell only at the end of the reselection interval, after the cell fully qualifies for reselection. This solution is costly in terms of reselection time, because the reselection time and SI acquisition time are cascaded.

The disclosed solution balances power-saving and reselection time: SI acquisition is started before full qualification of the candidate cell (i.e., reselection time and SI acquisition time are parallelized), but only for cells that initially meet the reselection criteria (i.e., cells for which the reselection interval is initiated).

The method of FIG. 2 addresses a single candidate cell and a single reselection interval, for the sake of clarity. In practice, it is possible that reselection unit 36 identifies two or more neighbor cells that meet the reselection criteria, and thus manages multiple overlapping reselection intervals.

When handling multiple candidate cells simultaneously, acquiring the SI of all the candidate cells may be too computationally intensive and/or too power consuming. Therefore, in some embodiments reselection unit 36 chooses a partial subset of the candidate cells whose reselection intervals have begun, and acquires the SI only for the cells in the partial subset. Unit 36 may use any suitable criterion for choosing the partial subset.

In an example embodiment, unit 36 chooses the candidate cell or cells whose reselection intervals are next to expire, and acquires the SI of the chosen cell or cells. In this embodiment, the cells in the partial subset are prioritized in accordance with some criterion, and reselection unit chooses to perform reselection to the highest-priority cell in the subset.

Typically, the full set of SI configuration parameters enables UE 20 to camp normally on the neighbor cell from which the SI is acquired. In some embodiments, however, the UE is able to perform parts of the overall camping tasks using only a subset of the full SI. Performing such partial tasks before the SI is fully acquired reduces the likelihood of reselection failures, and shortens the overall reselection time.

In an example embodiment, a certain "minimal set" of configuration parameters enables UE 20 to verify whether the neighbor cell in question is suitable for camping on. In order to be suitable for camping, the neighbor cell should, for example, not be barred from use, belong to the appropriate Mobile Country Code (MCC) and/or Mobile Network Code (MNC), and/or belong to the correct Public Land Mobile Network (PLMN). Criteria of this sort can be evaluated based on the minimal set, possibly in parallel, before the full SI is available. In some embodiments, a certain "medium set" of configuration parameters enables UE 20 to verify whether the neighbor cell in question is suitable for camping and access. Such a medium set typically comprises the minimal set, plus parameters needed for performing access to the cell.

Example lists of configuration parameters for the minimal, medium and full sets, for GSM, UMTS and LTE, are given in U.S. Provisional Patent Application 61/714,571, cited above and incorporated herein by reference. Alternatively, any other suitable sets can be used. In another alternative embodiment, UE 20 defines and uses only a minimum set and not a medium set, or only a medium set and not a minimal set.

In an example embodiment, reselection unit 36 identifies that the neighbor cell is unsuitable for camping, based on the minimal set, before the reselection interval ends. In response to this early identification, reselection unit 36 aborts the reselection evaluation for this cell and possibly switches to evaluate another candidate neighbor cell. This technique avoids unnecessary computation steps and possibly a false reselection on a cell that is unsuitable for camping in the first place.

Figure 3A:
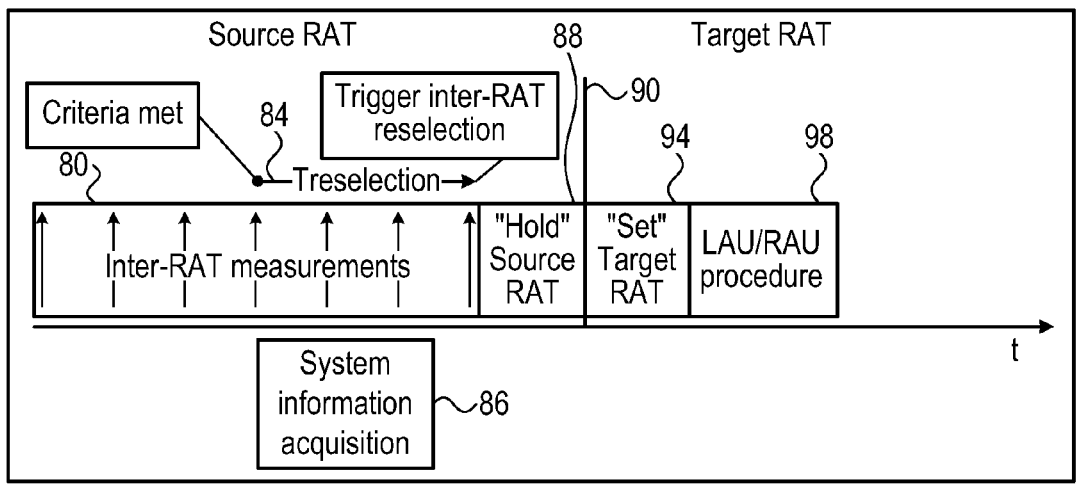
FIGS. 3A-3C are diagrams that schematically illustrate inter-RAT reselection scenarios, in accordance with embodiments that are described herein.

FIG. 3A is a diagram that schematically illustrates an example inter-RAT reselection process, in accordance with an embodiment that is described herein. The present example illustrates the case in which the reselection interval $T_{RESELECTION}$ is longer than the time needed for acquiring the full SI.

The process of FIG. 3A begins with neighbor cell evaluation unit 40 performing inter-RAT measurements 80, i.e., evaluating the signal quality of inter-RAT neighbor cells. At a certain point in time, a neighbor cell meets the reselection criteria. At this point, reselection unit 36 starts counting a reselection interval 84 for this neighbor cell. In parallel with reselection interval 84, SI acquisition unit 44 performs SI acquisition 86 on the neighbor cell. In this scenario, SI acquisition 86 is completed before the end of reselection interval 84.

Following interval 84, reselection unit triggers inter-RAT reselection. Reselection unit 36 holds the current RAT (referred to as "source RAT") during an interval 88 until a RAT transition point 90, and then sets the new RAT (referred to as "target RAT") at an interval 94. When the target RAT is set, reselection unit 36 registers with the neighbor cell during a Location Update/Routing Area Area Update/Tracking Area Update (LAU/RAU/TAU) interval 98.

If, on the other hand, the time needed for acquiring the full SI is longer than reselection interval $T_{RESELECTION}$, two scenarios are possible, depending on whether or not the medium set is received during the reselection interval.

Figure 3B:
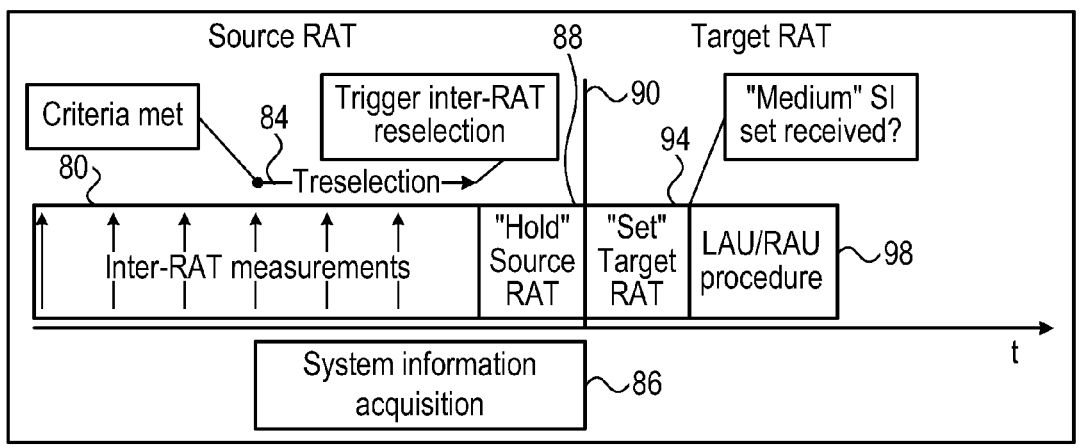

FIG. 3B is a diagram that schematically illustrates another example inter-RAT reselection process, in accordance with an embodiment that is described herein. The present example illustrates the case in which the medium set is fully received during the reselection interval. At end of interval 94 (as soon as the target RAT is set), reselection unit 36 checks whether the medium set is available. The answer in this example is positive, and thus the reselection unit proceeds to register with the neighbor cell at LAU/RAU/TAU interval 98.

Figure 3C:
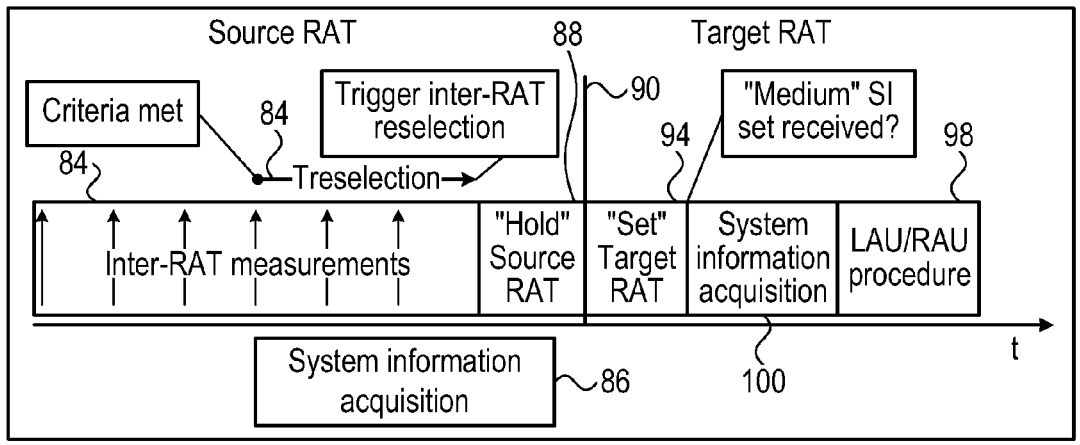

FIG. 3C is a diagram that schematically illustrates yet another inter-RAT reselection process, in accordance with an embodiment that is described herein. This example illustrates the case in which the medium set is not fully received during the reselection interval. When reselection unit 36 checks whether the medium set is available at the end of interval 94, the answer is negative. Thus, SI acquisition unit 44 continues the SI acquisition process at an interval 100, after which registration is performed at LAU/RAU/TAU interval 98. The overall reselection process of FIG. 3C is slightly longer than that of FIG. 3B.

Figure 4:
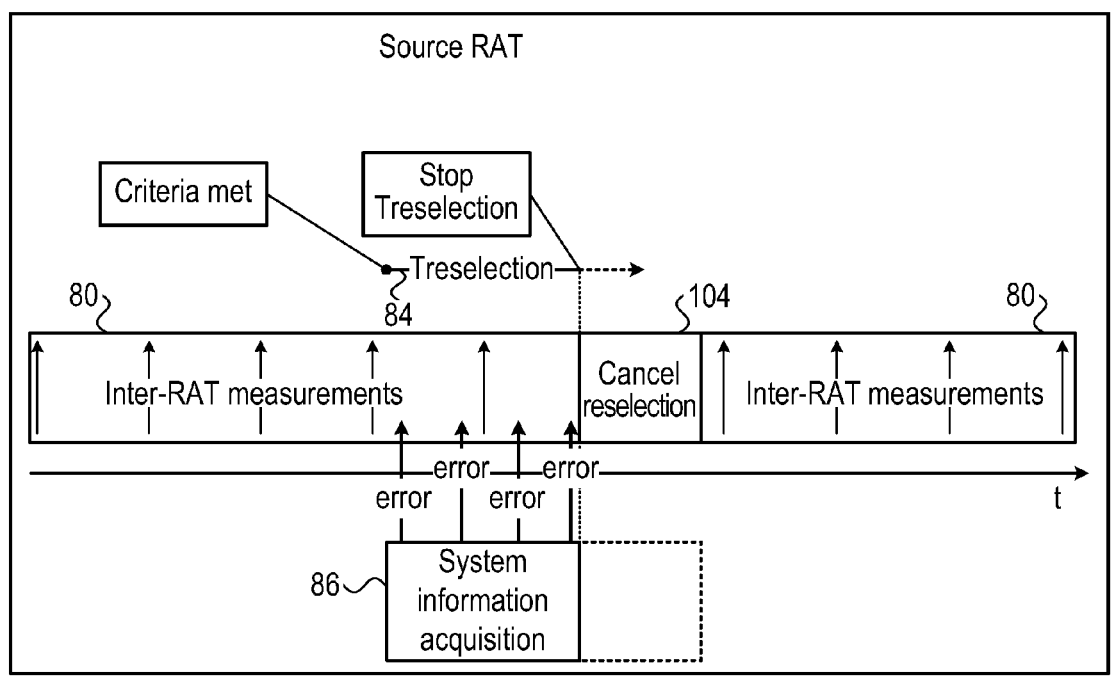
FIG. 4 is a diagram that schematically illustrates a failed inter-RAT reselection attempt, in accordance with an embodiment that is described herein.

FIG. 4 is a diagram that schematically illustrates a failed inter-RAT reselection attempt, in accordance with an embodiment that is described herein. In this example, SI acquisition unit 44 encounters errors (e.g., Layer-1 decoding errors) in acquiring the SI. In case of too many errors, SI acquisition unit 44 aborts the SI acquisition process, and reselection unit 36 aborts the reselection process for that neighbor cell at an interval 104. Neighbor cell evaluation unit 40 re-starts to perform inter-RAT measurements 80.

In some embodiments, the acquisition times for the minimal, medium and full sets of SI parameters are given in the following table (BC, TC and WC denote best-case, typical-case and worst-case, respectively). Detailed calculations that lead to these values are given in U.S. Provisional Patent Application 61/714,571, cited above. The estimation of SI acquisition time was performed in order to verify that $T_{RESELECTION}$ is usually greater than the SI acquisition time, so that SI acquisition is likely to complete before reselection is triggered. In GSM, the SI scheduling has little time variance. In UMTS and LTE the SI scheduling is dynamic, and therefore SI acquisition time is highly variable depending on configuration.

TABLE 1

Typical SI acquisition times

| | Minimum set | Medium set | Full set |
|---|---|---|---|
| GSM | ~720 mS WC | ~720 mS BC<br>1000-2000 mS TC<br>~7680 mS WC | ~960 mS BC<br>1000-2000 mS TC<br>~7680 mS WC |
| UMTS | 1000 mS TC<br>40960 mS WC | 1000-2000 mS TC<br>40960 mS WC | 1500-2000 mS TC<br>40960 mS WC |
| LTE | 30 mS BC<br>120 mS TC<br>120 mS WC | 110 mS BC<br>1280 mS TC<br>(according to<br>TS 36.133)<br>5240 mS WC | 1280 mS TC<br>(according to<br>TS 36.133)<br>5240 mS WC |

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal that is camped on a serving cell, evaluating signals of one or more neighbor cells, and permitting the terminal to switch to a neighbor cell in response to verifying that a signal of the neighbor cell meets a reselection criterion for at least a predefined time interval;
   initiating acquisition of one or more configuration parameters of the neighbor cell before the predefined time interval of the neighbor cell has ended, even though the mobile communication terminal is not yet permitted to switch to the neighbor cell; and
   following the predefined time interval, switching to camp on the neighbor cell using the acquired configuration parameters.

2. The method according to claim 1, comprising communicating with the serving cell using a first Radio Access Technology (RAT), and communicating with the neighbor cell using a second RAT that is different from the first RAT.

3. The method according to claim 1, wherein initiating the acquisition comprises acquiring, during the predefined time interval, a subset of the configuration parameters that enables verification that the terminal is permitted to camp on the neighbor cell, and switching to camp on the neighbor cell following the predefined time interval only upon ascertaining that the terminal is permitted to camp on the neighbor cell.

4. The method according to claim 1, wherein initiating the acquisition comprises acquiring, during the predefined time interval, at least part of a subset of the configuration parameters that enables verification that the terminal is permitted to camp on the neighbor cell and further enables access to the neighbor cell, and switching to camp on and access the neighbor cell following the predefined time interval upon obtaining the subset of the configuration parameters.

5. The method according to claim 4, comprising, upon identifying that the subset of the configuration parameters is not fully available following the predefined time interval, completing to acquire the subset, and only then switching to camp on and access the neighbor cell.

6. The method according to claim 1, wherein evaluating the signals comprises initiating multiple predefined time intervals for multiple respective neighbor cells, and wherein initiating the acquisition comprises selecting one or more of the multiple neighbor cells and initiating the acquisition of the configuration parameters only for the selected neighbor cells.

7. The method according to claim 6, wherein selecting the one or more neighbor cells comprises choosing the one or more neighbor cells whose predefined time intervals are nearest to expire.

8. The method according to claim 1, and comprising aborting the acquisition upon detecting errors in the acquired configuration parameters.

9. The method according to claim 1, wherein initiating the acquisition of the configuration parameters comprises initiating reception of a System Information (SI) message from the neighbor cell.

10. Apparatus, comprising:
    a receiver, which is configured to receive signals from a serving cell and from one or more neighbor cells; and
    processing circuitry, which is configured to evaluate the signals of the neighbor cells while camped on a serving cell and to permit switching to a neighbor cell in response to verifying that a signal of the neighbor cell meets a reselection criterion for at least a predefined time interval, to initiate acquisition of one or more configuration parameters of the neighbor cell before the predefined time interval of the neighbor cell has ended, even though the mobile communication terminal is not yet permitted to switch to the neighbor cell, and, following the predefined time interval, to switch to camp on the neighbor cell using the acquired configuration parameters.

11. The apparatus according to claim 10, wherein the processing circuitry is configured to communicate with the serving cell using a first Radio Access Technology (RAT), and to communicate with the neighbor cell using a second RAT that is different from the first RAT.

12. The apparatus according to claim 10, wherein the processing circuitry is configured to acquire, during the predefined time interval, a subset of the configuration parameters that enables verification that the neighbor cell is permitted for camping on, and to switch to camp on the neighbor cell following the predefined time interval only upon ascertaining that the neighbor cell is permitted for camping on.

13. The apparatus according to claim 10, wherein the processing circuitry is configured to acquire, during the predefined time interval, at least part of a subset of the configuration parameters that enables verification that the neighbor cell is permitted for camping on, and further enables access to the neighbor cell, and switching to camp on and access the neighbor cell following the predefined time interval upon obtaining the subset of the configuration parameters.

14. The apparatus according to claim 13, wherein the processing circuitry is configured, upon identifying that the subset of the configuration parameters is not fully available following the predefined time interval, to complete to acquire the subset, and only then to switch to camp on and access the neighbor cell.

15. The apparatus according to claim 10, wherein the processing circuitry is configured to initiate multiple predefined time intervals for multiple respective neighbor cells, to select one or more of the multiple neighbor cells, and to initiate the acquisition of the configuration parameters only for the selected neighbor cells.

16. The apparatus according to claim 15, wherein the processing circuitry is configured select the one or more neighbor cells whose predefined time intervals are nearest to expire.

17. The apparatus according to claim 10, wherein the processing circuitry is configured to abort the acquisition upon detecting errors in the acquired configuration parameters.

18. A mobile communication terminal comprising the apparatus of claim 10.

19. A chipset for processing signals in a mobile communication terminal, comprising the apparatus of claim 10.

* * * * *